United States Patent [19]

Brenner et al.

[11] 4,164,512
[45] Aug. 14, 1979

[54] FOAMABLE THERMOELASTIC IONOMER COMPOSITION

[75] Inventors: Douglas Brenner, Livingston; Robert D. Lundberg, Bridgewater, both of N.J.

[73] Assignee: Exxon Research & Engineering Co., Florham Park, N.J.

[21] Appl. No.: 855,727

[22] Filed: Nov. 29, 1977

Related U.S. Application Data

[63] Continuation-in-part of Ser. No. 839,172, Oct. 4, 1977.

[51] Int. Cl.² .................................................. C08J 9/00
[52] U.S. Cl. ............................. 521/93; 260/31.2 MR; 260/31.2 R; 260/32.6; 260/32.6 A; 260/33.6 AQ; 260/33.6 UA; 260/42.33; 260/42.35; 260/42.37; 260/42.38; 521/82; 521/91; 521/92; 521/94; 521/95; 521/97; 521/140; 521/150; 521/153; 521/905
[58] Field of Search .................. 260/2.5 HA; 521/93, 521/140, 150, 94, 95

[56] References Cited

U.S. PATENT DOCUMENTS

| | | | |
|---|---|---|---|
| 3,396,136 | 8/1968 | Dickerson | 260/30.6 R |
| 3,821,148 | 6/1974 | Makowski et al. | 260/30.6 R |
| 3,821,149 | 6/1974 | Makowski et al. | 260/30.6 R |
| 3,842,154 | 10/1974 | Lundberg et al. | 264/294 |
| 3,847,854 | 11/1974 | Carter et al. | 260/23.7 M |
| 3,852,096 | 12/1974 | Lundberg et al. | 260/31.8 M |
| 3,867,319 | 2/1975 | Lundberg | 260/2.5 H |
| 3,870,662 | 3/1975 | Lundberg | 260/2.5 H |
| 3,870,841 | 3/1975 | Makowski et al. | 260/23.7 R |
| 3,925,280 | 12/1975 | Lundberg et al. | 260/23 R |
| 3,939,242 | 2/1976 | Lundberg et al. | 264/294 |
| 3,947,387 | 3/1976 | Lundberg | 260/2.5 R |
| 3,974,240 | 8/1976 | Bock et al. | 260/897 B |
| 3,974,241 | 8/1976 | Lundberg et al. | 260/897 B |
| 4,014,831 | 3/1977 | Bock et al. | 260/23 H |

*Primary Examiner*—Morton Foelak
*Attorney, Agent, or Firm*—Richard E. Nanfeldt

[57] ABSTRACT

This invention relates to a novel elastomeric foamed material which has been found to exhibit a variety of unusual and desirable features both in its physical properties and in its process of manufacture. These foamed compositions of a lightly sulfonated elastomeric gum contain a non-volatile polar plasticizer and preferably extenders such as oil and fillers. These elastomer foams exhibit an unusual profile of physical properties including extremely rapid production, melt reprocessability of fabricated articles, a novel memory characteristic, and high temperature reshaping of foamed objects while maintaining a good foam structure. These novel foams can be manufactured with relatively uniform cell structures and with small cell sizes at foam densities from near bulk density to less than 0.1g/cc.

3 Claims, No Drawings

FOAMABLE THERMOELASTIC IONOMER COMPOSITION

CROSS REFERENCE TO RELATED APPLICATION

This application is a Continuation-In-Part of copending application Ser. No. 839,172 filed Oct. 4, 1977.

BACKGROUND OF THE INVENTION

1. Field of the Invention

This invention relates to a novel elastomeric foamed material which has been found to exhibit a variety of unusual and desirable features both in its physical properties and in its process of manufacture. These foamed compositions of a lightly sulfonated elastomeric gum contain a non-volatile polar plasticizer and preferably extenders such as oil and fillers. These elastomer foams exhibit an unusual profile of physical properties including extremely rapid production, melt reprocessability of fabricated articles, a novel memory characteristic, and high temperature reshaping of foamed objects while maintaining a good foam structure. These novel foams can be manufactured with relatively uniform cell structures and with small cell sizes at foam densities from near bulk density to less than 0.1 g/cc.

2. Description of the Prior Art

Foamed articles have represented one of the fastest growing markets in the polymer industry in the past 15 years. This growth is expected to continue, and it is claimed that the potential usage of foamed polymers could far exceed the ability of the polymer industry to supply the needed materials.

The market for flexible foams is currently dominated by chemically crosslinked polymers, for example, polyurethanes and sponge rubbers. The time required for curing these materials is costly; for example, vulcanized elastomer foams such as vulcanized EPDM can require as long as two hours or more to cure. Also, the resultant lack of reprocessability can be a major handicap since many foaming operations generate up to 25% scrap.

The present invention relates to unique and novel elastomer foams which have been found to possess several unexpected and useful characteristics. These novel foams contain a low concentration of sulfonate groups which are covalently appended to the elastomeric polymer backbone. These flexible ionomer foams are effectively crosslinked by the physical associations of sulfonate salt groups from different molecules. It has been found that in specified sulfonated elastomer systems these associations can provide a strong and tough material at use temperatures; yet at sufficiently elevated temperatures these associations can be disrupted to enable melt flow and melt fabrication. An important aspect of this material as specified in this invention is that it contains a non-volatile polar plasticizer which greatly improves the flow or processability of the material at processing temperature. The continued presence of the non-volatile polar plasticizer in the foam subsequent to the foaming process is crucial for many of the important characteristics of these novel foams such as the thermal reformability, the melt reprocessability and the memory characteristics which are described below. A major advantage in the production of elastomer lightly sulfonated thermoelastic foams is that no post cure is required. This can result in a large savings in production time, machinery and cost. Also, no precure is required, and this can also make the foaming process less complicated and more efficient. These process advantages together with the virtues of melt reprocessability, thermal reformability, the memory characteristic, and the temperature insensitivity of the material during the foaming process make these foams extremely attractive candidates for a variety of flexible foam applications.

The preferred sulfonated elastomeric compositions of the present invention are derived from elastomeric polymers having a primarily hydrocarbon backbone with olefinic unsaturation, especially elastomeric polymers such as butyl and EPDM rubbers. Some processes for sulfonating such polymers are described in U.S. Pat. Nos. 3,642,728 and 3,836,511. Some methods for using polar additives to weaken the physical crosslinks at elevated temperature and improve processability in non-foamed articles of these lightly sulfonated polymers are included in U.S. Pat. No. 3,847,854.

U.S. Pat. No. 3,867,319 teaches a process for foaming an ionic polymer using a volatile polar plasticizer. A preferred method of foaming taught by that patent is dissolving of the ionic polymer in a solvent containing a volatile polar plasticizer and foaming by heating at atmospheric pressure in an oven. That patent differs from the instant invention in that a non-volatile polar plasticizer which is a high temperature flow improver is specified in the instant invention and, as mentioned above, the non-volatile polar plasticizer is required to obtain the unique set of characteristics of the flexible foams of the instant invention. In addition, the preferred method of foaming taught in U.S. Pat. No. 3,867,319 (which is described above) was found to be ineffective for producing satisfactory foams of the ionic elastomer materials considered here.

U.S. Pat. No. 3,947,387 claims novel ionic foams which are produced by using a volatile polar plasticizer. Again, such foams lack the essential ingredient of the non-volatile polar plasticizer which is critical to several of the most important characteristics of the foam of the instant invention.

U.S. Pat. No. 4,051,217 describes a fabrication process for multiphased plastics which includes ionic plastic foams. That process deals only with ionomers derived from a plastic material and explicitly excludes elastomeric polymers; therefore that application does not bear on the instant invention which is concerned specifically with the novel characteristics of an ionic elastomer foam.

The present invention differs from the ionic polymer systems disclosed in U.S. Pat. No. 3,322,734, herein incorporated by reference, in that the products of the present invention are preferably neutralized at least about 95%. The strong association of these fully neutralized ionic polymers of the present inventions are weakened at elevated temperatures by the addition of suitable plasticizing agents which disrupt the ionic domains and permit the foaming process. On the other hand, U.S. Pat. No. 3,322,734 teaches that the acid form of the ionic polymer should not be completely neutralized—preferably the neutralization should be only 80% complete and in no case should exceed 90% of the stoichiometric equivalence. Thus, it is emphasized in U.S. Pat. No. 3,322,734 that incomplete neutralization of the acid moiety is essential in order that the resulting products be fabricated.

The foams described in the present instant invention may be characterized as follows:

(a) the foamed products of the present invention are tough, strong and rubbery at use temperature behaving in many ways like a chemically crosslinked elastomer;

(b) at sufficiently high temperatures the foamed products of the present invention which contain a non-volatile polar plasticizer can be made to have excellent melt rheological properties so these products, or used or scrap material can be readily melt reprocessed, thereby enabling reuse and refoaming of waste material;

(c) due to the unique ionic bonding in these systems and the incorporation of a non-volatile high temperature polar flow improver, it has been found that in an appropriate elevated temperature range these foams have the characteristic of being reformable into different shapes without substantially damaging the foam structure (see e.g., Example 7);

(d) when reshaped at slightly elevated temperatures and cooled, these flexible foams exhibit a novel memory effect;

(e) the production of these foams from the bulk material (containing a non-volatile polar plasticizer, foaming agents, flow improvers and compounding ingredients) exhibits several unusual and important characteristics such as insensitivity of the foam production to temperature changes over a wide temperature region, very rapid foam production because curing is not required, and excellent rheological melt properties;

(f) these thermoplastic elastomer foams can be rapidly produced by either high pressure compression molding or extrusion foaming; and (g) rubbery foams of good cell uniformity and small cell size can be produced at densities from below 0.1 g/cc up to near bulk density.

SUMMARY OF THE INVENTION

The present invention relates to unique and novel sulfonated elastomeric foam articles and processes for foaming these articles, wherein a sulfonated elastomeric polymer composition is modified with a non-volatile polar plasticizer, foaming agents, and preferably other chemical additives, and is foamed to produce articles which exhibit a variety of unusual and desirable physical and rheological properties.

Accordingly, it is an object of our present invention to provide novel sulfonated elastomeric foam compositions having superior quality and unusual characteristics, wherein the compositions are formed from sulfonated elastomeric polymers, a non-volatile polar plasticizer and preferably selected chemical additives.

GENERAL DESCRIPTION OF THE INVENTION

The present instant invention relates to improved sulfonated elastomeric foamed articles and foaming processes for forming these articles wherein the sulfonated elastomeric foams exhibit an unusual and useful profile of physical characteristics, and wherein simple and unusually rapid processes are used to produce or modify the foams.

The elastomeric polymers of the present invention are derived from synthetic and natural polymers having olefinic unsaturation sites, wherein the polymer has from about 0.1 to about 10.0 mole % olefinic unsaturation. The unsaturation sites can be in the polymer backbone, pendant therefrom or cyclic.

In particular, the unsaturated polymers of this present invention include low unsaturated polymers such as butyl rubber, halo-butyl or EPDM terpolymers. Additionally, other unsaturated polymers contemplated are partially hydrogenated isoprene, partially hydrogenated polybutadiene, or an isoprene-styrene random copolymer.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000 especially about 100,000 to about 400,000 and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably about 1 to about 4%, e.g. 2%.

Illustrative of such a Butyl rubber is Exxon Butyl 218 (Exxon Chemical Co.), having a viscosity average molecular weight of about 450,000, a mole % unsaturation of about 1.5% and a Mooney viscosity of about 55° at 260° F. at 8 minutes.

Halogenated butyl rubber is commercially available and may be prepared by halogenating Butyl rubber in a solution containing between 1 to 60% by weight of Butyl rubber in a substantially inert $C_5$–$C_8$ hydrocarbon solvent such as pentane, hexane, heptane, etc. and contacting this Butyl rubber cement with a halogen gas for a period of about 25 minutes, whereby halogenated Butyl rubber and a hydrogen halide are formed, the copolymer containing up to one halogen atom per double bond in the copolymer. The preparation of halogenated Butyl rubber is old in the art, see e.g. U.S. Pat. No. 3,099,644 which is incorporated herein by reference. This invention is not intended to be limited in any way by the manner in which Butyl rubber is halogenated, and both chlorinated and brominated Butyl rubber are suitable for use in this invention.

Illustrative of halogenated Butyl rubbers is Exxon Butyl HT-10-66 (a chlorinated Butyl rubber containing about 1.3 wt. % chlorine, having about 1.7 mole % unsaturation and a viscosity average molecular weight of about 357,000).

Low molecular weight Butyl rubbers, i.e. Butyl rubbers having a viscosity average molecular weight of about 5,000 to 85,000 and a mole % unsaturation of about 3 to about 4% may be sulfonated by the process of this invention. Preferably, these polymers have a viscosity average molecular weight of about 25,000 to about 60,000.

The term "EPDM" is used in the sense of its definition as found in ASTM D-1418-64 and is intended to mean a terpolymer containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred terpolymers contain about 40 to about 80 wt. % ethylene and about 2 to about 10 wt. % of a diene monomer, the balance of the polymer being propylene. More preferably, the polymer contains about 45 to about 75 wt. % ethylene, e.g. 50 wt. % and about 2.6 to about 10 wt. % diene monomer, e.g. 5.0 wt. %. The diene monomer is preferably a non-conjugated diene. The $\overline{M}n$ of the terpolymer is preferably about 10,000 to about 200,000; more preferably about 15,000 to about 100,000; and most preferably about 20,000 to about 60,000. The Mooney viscosity of the terpolymer at (1+8) minutes at 212° F. is preferably 5 to 90, more preferably 10 to 60 and most preferably 15 to 50 e.g. 40. The $\overline{M}v$ of the EPDM is preferably below about 350,000 and more preferably below about 300,000; e.g. 270,000. The $\overline{M}w$ of the EPDM is preferably below about 500,000 and more preferably below about 350,000, e.g. 343,000.

Illustrative of these non-conjugated diene monomers which may be used in the EPDM terpolymer are 1,4-hexadiene, dicyclopentadiene, ethylidene norbornene, methylene norbornene, propylidene norbornene and methyl tetrahydroindene.

A typical EPDM is Vistalon 2504 (Exxon Chemical Co.) a terpolymer having a Mooney viscosity at (ML, 1+8, 212° F.) of about 40 and having 50 wt. % of ethylene, 45 wt. % of propylene, and 5.0 wt. % of 5-ethylidene-2-norbornene with an $\overline{M}n$ of about 47,000, an $\overline{M}v$ of about 145,000 and an $\overline{M}w$ of about 174,000. The Vistalon 2504 can be reprocessed through an extruder until a 20 Mooney value has been achieved.

Another EPDM terpolymer, Vistalon 2504-20 is derived from Vistalon 2504 (Exxon Chemical Co.) by a controlled extrusion process, wherein the resultant Mooney viscosity at 212° F. is about 20. The $\overline{M}n$ of Vistalon 2504-20 is about 26,000, the $\overline{M}v$ is about 90,000 and the $\overline{M}w$ is about 125,000.

Vistalon 3708 (Exxon Chemical Co.) is a terpolymer having a Mooney viscosity (ML, 1+8, 260° F.) of about 45–55 and having about 65 wt. % of ethylene, about 3.3 wt. % of 5-ethylidene-2-norbornene; and about 31.7 wt. % of propylene with an $\overline{M}n$ of about 53,000, an $\overline{M}w$ of about 343,000 and an $\overline{M}v$ of about 27,000.

Vistalon 6505 (Exxon Chemical Co.) is a terpolymer having a Mooney viscosity (ML, 1+8, 260° F.) of about 45–55 and having about 53 wt. % of ethylene, about 9.0 wt. % of 5-ethylidene-2-norbornene and about 38 wt. % of propylene.

Nordel 1320 (DuPont) is another EPDM terpolymer having a Mooney viscosity (ML, 1+8, 212° F.) of about 25 and having about 53 wt. % of ethylene, about 3.5 wt. % of 1,4-hexadiene and about 43.5 wt. % of propylene.

In carrying out the present invention, an olefinically unsaturated polymer is sulfonated with a sulfonating agent according to, for example, the method of either U.S. Pat. Nos. 3,642,728 and 3,836,511, both of which are herein incorporated by reference.

It should be pointed out that neither the sulfonating agent nor the manner of sulfonation is critical, provided that the sulfonating method does not degrade the polymer backbone.

In the practice of this invention, the polymer to be sulfonated can be dissolved in a suitable solvent and reacted with the sulfonating agent. The solvent medium should be a neutral one for the rubber and the sulfonating agent. The solvent is preferably an aromatic hydrocarbon, an aliphatic hydrocarbon, or a halogenated aromatic hydrocarbon.

Sulfonation of the polymer is conducted at a temperature between −10° C. and +100° C. Sulfonation occurs, when the sulfonating agent is added to the polymer solution. The sulfonating agent is preferably dissolved in a suitable solvent. Reaction time at room temperature may be about 5 min. to about 60 min., more preferably about 30 min.

The acid form of the sulfonated elastomeric can be quenched with a liquid aliphatic alcohol.

The amount of desirable sulfonation depends on the particular application. Preferably, the elastomeric polymer is sulfonated at about 10 to about 100 meq. $SO_3H$/100 g of polymer, more preferably at about 15 to about 50 meq. $SO_3H$/100 g of polymer, and most preferably to about 20 to about 45 meq. $SO_3H$/100 g of polymer. The meq. of $SO_3H$/100 g of polymer was determined by dissolving the acid form of the sulfonated polymer in a mixed solvent of 95 parts of toluene and 5 parts of methanol at a concentration level of 50 grams per liter of solvent. The acid form is titrated with sodium ethoxide to an Alizarin Thymolphthalein endpoint. Sulfur analysis was done by Dietert Analysis.

Polymers containing unsaturation and sulfonic acid groups have been found to be somewhat deficient in thermostability. Therefore, it is desirable to neutralize the acid groups as part of the manufacturing of sulfonated elastomeric polymer. Neutralization further improves the physical properties of the sulfonated polymer. Thus, the acid form of the polymer lacks adequate physical properties and often the stability to be useful in the applications envisioned for the foamed products.

In preparing the ionomer it is not necessary to neutralize every sulfonic acid group. Preferably, enough base is added to theoretically neutralize at least about 95 of the sulfonic acid groups; more preferably at least about 98; and most preferably at least about 99.

The neutralizing agents of the present invention are metallic salts of carboxylic acids, wherein the metallic ion of the metallic salt is selected from the group consisting of Groups IA, IIA, IB, IIB, Al or Pb of the Periodic Table of Elements and mixtures thereof. (See page B-3, "Handbook of Chemistry and Physics", Chemical Rubber Publishing Co., 47th Ed.). Suitable monovalent metal ions include $Na^+$, $K^+$, $Li^+$, $Cs^+$, $Ag^+$, $Hg^+$ and $Cu^+$. Suitable divalent metal ions include $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Fe^{+2}$, $Pb^{+2}$, $CO^{+2}$, $Ni^{+2}$ and $Zn^{+2}$. A preferred cation is $Zn^{+2}$.

Other neutralizing agents of this invention are metallic oxides, hydroxides, or $C_1$ to $C_{20}$ alkoxides, $C_1$ to $C_{20}$ alkanoates and mixtures thereof, wherein the metallic ion is selected from the group consisting essentially of Groups IA, IIA, IB and IIB and mixtures thereof of the Periodic Table of Elements. Illustrative examples are lead oxide, zinc oxide, calcium oxide, magnesium oxide, ammonium hydroxide, sodium hydroxide, magnesium hydroxide, calcium hydroxide, or sodium ethoxide.

Still other useful neutralizing agents are primary, secondary and tertiary amines having up to 30 carbons.

The foam compositions of the present invention are formed from a blend of the neutralized sulfonated elastomeric polymer, a non-volatile polar plasticizer which is used to control the viscoelasticity of the elastomeric ionomer at processing temperatures, a foaming agent, and preferably oils and fillers. Selected crystalline polymers and lubricants may also be added in minor amounts. Other additives such as coloring agents and stabilizers which are known in the art can also be added, if desired. The cell structure of the resultant foams depends in a complex way on a number of interdependent variables including the choice of non-volatile polar plasticizer, the amount of non-volatile polar plasticizer, the foaming agent, the sulfonated gum, and the various additives and their concentrations. In addition, the details of the particular foaming process can have a significant effect on cell structure, for example, whether extrusion, compression molding or some other foaming procedure is used, and the temperatures, heating times, or foaming rates employed. Some specific examples of some materials, techniques, and conditions which produce satisfactory foams are given later in this application.

A preferential polar plasticizer is used to help weaken the ionic associations of the neutralized sulfonate groups prior to, and during the foaming operation. This is necessitated by the fact that for most neutralized sulfonated elastomeric polymers, quite high temperatures are required to obtain appreciable flow rates; and, for some, this temperature is above the thermal decomposition temperature of the polymer. The preferential polar plasticizer, through the weakening of the ionic associations decreases, the melt viscosity of the neutralized sulfonated elastomeric polymer at elevated temperatures thereby making it readily processable.

By the proper selection of the preferential polar plasticizer, it is possible to obtain excellent physical properties for the plasticized, neutralized sulfonated elastomeric polymer. A preferred class of preferential plasticizers are metallic salts of fatty acids wherein the fatty acid has about $C_{12}$ to about $C_{40}$ carbon atoms, more preferably about $C_{14}$ to about $C_{26}$, most preferably about $C_{16}$ to about $C_{22}$ carbon atoms and the metallic cation is selected from the group consisting of zinc, antimony, lead or Groups IA, IIA, IB or IIB of the Periodic Table of Elements and mixtures thereof. Because with metal salts the cation might partially exchange with the cation of the neutralized sulfonated polymer, it is preferable (but not necessary) that the metal salt contain the same cation as the sulfonated polymer. A preferred plasticizer is zinc stearate, preferably in combination with a zinc neutralized sulfonated polymer. A less preferred class of preferential plasticizer is the aforementioned fatty acids alone or in combination with the aforementioned metallic salts of the fatty acids. Other preferential plasticizers which are preferred in the instant compositions include amides, ureas, amines or thioureas and mixtures thereof. The preferential plasticizers are incorporated into the compositions at about 0 to about 60 parts by weight per hundred parts of the metal neutralized sulfonated elastomeric polymer, more preferably at about 2 to about 40, and most preferably about 8 to about 30.

Polar plasticizers can be distinguished into two categories—volatile and non-volatile plasticizers. The major practical difference between the two types is that the non-volatile plasticizers remain with the final product while the volatile plasticizers are volatilized from the ionomer during or shortly after a processing operation.

The foams of this invention require the use of a non-volatile polar plasticizer to achieve several of their desirable and unusual properties. For example, the thermal reshaping process described earlier and also detailed in an example requires the presence of the non-volatile plasticizer; and the economically important characteristic of being able to melt reprocess scrap foam or to refabricate used or discarded foam requires the presence of the non-volatile plasticizers. At the elevated temperature at which foaming takes place (and also any thermal reshaping operations or reprocessing) the non-volatile polar plasticizer must be very effective in reducing the melt viscosity of the sulfonated elastomer to enable rapid and satisfactory foaming.

The foaming agents used in combination with the preferential polar plasticizer include chemical compounds that decompose at or below the temperature of foaming to liberate gases, and low boiling liquids which are converted into gaseous form by heating. The chemical foaming agents have been found to be particularly easy to use and generally give excellent results.

The blowing (foaming) agent may be a chemical blowing agent or a physical blowing agent or a combination of chemical and physical blowing agents. In the case of physical blowing agents a nucleating agent may be helpful for obtaining good cell structure. Chemical blowing agents are particularly effective as nucleating agents for physical blowing agents. If a physical blowing agent is used, the ionic elastomeric material must not be soluble in the physical blowing agent nor should the backbone polymer chain (in the absence of the ionic group) be soluble in the physical blowing agent. In the foaming process the polymer is heated under pressure and the foam structure is nucleated by rapid decrease in the pressure. Heating the polymer without utilizing a rapid decrease in pressure was not found to be very effective in producing foam of relatively uniform cell structure. The foaming of the elastomeric ionomer material differs from the foaming of thermoplastic ionomer materials such as lightly sulfonated polystyrene in that heating at atmospheric pressure is able to produce good quality foams of sulfonated polystyrene. Also, it is known that many sulfonated polystyrene foams using physical blowing agents did not require nucleating agents.

The foaming agents used in the process of the instant invention are well known in the art and include compounds which when incorporated in the polymer composition decompose at or below the temperature of foaming to liberate gases, and the low boiling liquids which are converted into gaseous form by heating.

Examples of foaming agents which decompose at specific temperatures to liberate gases include the following representative compounds for which the approximate temperature range of decomposition for the neat material is indicated in parenthesis: sodium bicarbonate (160°–200° C.), sodium bicarbonate and citric acid combination (0° C. to 200° C.), azobis formamide combination (160°–200° C.), azobisisobutyronitrile (90°–115° C.), diazoaminobenzene (90°–110° C.), N,N'-dimethyl-N,N'-dinitroisoterephthalamide (90°–105° C.), N,N'-dinitrosopentamethylenetetramine (130°–190° C.), toluene-4-sulfonyl hydrazide (100°–110° C.), 4,4'-oxybis (benzene sulfonyl hydrazide) (120°–140° C.), and similar compounds known in the art. (For example, see reference "Plastic Foams"; Vol. II, by C. J. Bennings, Wiley Interscience Publishers, 1969, Appendix A-II.

When chemical foaming agents are employed, generally from about 0.25 to about 5 parts per hundred by weight (based on 100 parts of the neutralized sulfonated elastomeric polymer) of the foaming agent will be used; more preferably about 0.5 to about 4.

If a low boiling liquid is used as a foaming agent, suitable liquids include butane, pentane, hexane, and heptane. Similarly, materials which are gases at room temperature may be injected into the material to be foamed under pressure. Such gases include carbon dioxide, dichlorodifluoromethane, nitrogen and the like.

In the preparation of the foam composition, a nucleating agent can also be added to the compositions, if it is needed, to produce a foam having small and uniform cells. Typical nucleating agents are citric acid and sodium bicarbonate as well as a metallic oxide such as magnesium oxide.

Various additives can be compounded with the plasticized neutralized sulfonated elastomeric polymers, wherein the physical and rheological properties are modified due to the incorporation of these additives. The additives include fillers, pigments, lubricants and polyolefinic thermoplastics, process oils and mixtures thereof. These additives can be incorporated in the blend compositions by techniques well known in the art. For example, the additive can be incorporated into the composition to be foamed by dry compounding on a two roll mill at a temperature below the blowing temperature of the foaming agent. A proper balance of oil, fillers and polar plasticizers are required to produce a foam having good cell structure and satisfactory density. For instance, too little polar plasticizer will result in a foam having highly irregular cell structure and poor physical properties.

The fillers employed in the present invention include carbon black, alumino-silicates, talcs, calcium silicate, ground calcium carbonate, water precipitated calcium carbonate, or delaminated, calcined or hydrated clays and mixtures thereof. The carbon blacks are selected from the group consisting essentially of furnace, channel, metallic, lamp or acetylinic blacks. These fillers are incorporated into the composition at about 0 to about 250 parts per hundred by weight based on the 100 parts of the sulfonated polymer; more preferably at about 0 to about 200; and most preferably at about 10 to about 150. Typically, these fillers have a particle size of about 0.03 to about 15 microns, more preferably about 0.05 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

The oils employed in the present invention are non-polar backbone process oils having less than about 2 wt. % polar type compounds as measured by molecular type clay gel analysis. These oils are selected from paraffinics ASTM Type 104B as defined in ASTM D-2226-70, aromatics ASTM Type 102 or naphthenics ASTM Type 104A wherein the oil has a flash point by the Cleveland open cup of at least 350° F., a pour point of less than 40° F., a viscosity of about 70 to about 3000 s.s.u.'s and a number average molecular weight of about 300 to about 1000, more preferably about 400 to about 750. The preferred process oils are paraffinics. Typical oils are summarized in Table II.

The oils are incorporated into the blend composition at a concentration level of about 0 to about 150 parts per hundred based on 100 parts of the sulfonated polymer. More preferably at about 5 to about 125 and most preferably at about 10 to about 100.

TABLE II

| Type Oil | Oil Code # | Viscosity ssu | $\overline{M}_n$ | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

Various other chemical additives can be incorporated into the blend compositions to improve the physical properties, the appearance, the chemical properties of the foamed elastomeric article or to modify the processability of the compositions for foaming.

A crystalline polyolefinic thermoplastic can be incorporated into the blend composition in minor proportions as a means for modification of the rheological properties of the foam compositions as well as the rigidity of the expanded foam article. Typically, the crystalline polyolefinic thermoplastic is added to the foam composition at a concentration level of about 0 to about 100 parts per hundred by weight based on 100 parts of sulfonated polymer, more preferably at about 0 to about 75; and most preferably at about 0 to about 50.

The crystalline polyolefin is characterized as a polymer of an alpha-olefin having a molecular weight of at least 2,000, preferably at least 10,000, and more preferably at least 20,000. This material comprises substantially an olefin but may incorporate other monomers, for example, vinyl acetate, acrylic acid, methyl acrylate, ethyl acrylate, sodium acrylate, methyl methacrylate, ethyl methacrylate, methacrylic acid, sodium methacrylate, etc. The preferred polyolefins are selected from the group consisting of polymers of $C_2$ to $C_4$ alpha-olefins. Most preferably the polyolefins are selected from the group consisting of polyethylene, polybutene, polypropylene and ethylene-propylene copolymers. It is critical that the crystalline polyolefin have a degree of crystallinity of at least 25% and most preferably at least 40%.

TABLE I

| Filler | Code # | Oil Absorption grams of oil/100 grams of filler | Specific Gravity | Avg. Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil DL | 30 | 2.61 | 4.5 | 6.5–7.5 |
| Hydrated clay | Suprex | | 2.6 | 2 | 4.0 |
| Calcined clay | Icecap IL | 50–55 | 2.63 | 1 | 5.0–6.0 |
| Talc magnesium silicate | Mistron Vapor | 60–70 | 2.75 | 2 | 9.0–7.5 |

Both high and low density polyethylene are within the scope of the instant invention. For example, polyethylenes having a density from 0.90 to 0.97 gms/cc are generally included. Polypropylene polymers having intermediate and high densities are the preferred examples of the polypropylene materials useful in the instant invention. These materials will have a density from 0.88 to 0.925 gms/cc. The polyethylene or polypropylene can also be combined as copolymers thereof so long as adequate crystallinity is obtained in said combination. Thus, block copolymers wherein polyethylene or polypropylene is present in crystalline form are effective.

Zinc oxide can be incorporated into the blend as a whitening pigment. The zinc oxide is incorporated into the blend composition at a concentration level of about 0 to about 50 parts per hundred by weight based on 100 parts of sulfonated polymer, more preferably about 0 to about 25.

Alternatively a Rutile or Anatase titanium dioxide can be employed as a whitening pigment.

A metallic hydroxide can be incorporated into the blend composition as a means of further neutralizing any residual free acid in the elastomeric compositions. The metallic hydroxide is incorporated at a concentration level of about less than 50 parts per hundred based on the neutralized sulfonated elastomeric polymer, wherein the metal ion of the metallic hydroxide is selected from Group IIA of the Periodic Table of Elements such as barium, calcium or magnesium.

A lubricant can be employed into the foam composition at a concentration level of about 0 to about 50 parts per hundred based on 100 parts of the neutralized sulfonated elastomeric polymers and more preferably about 5 to about 25. The lubricants of the present instant invention are non-polar paraffinic hydrocarbon waxes having a softening point of about 135° F. to about 220° F., more preferably 150° F. to 200° F., wherein the wax has a number average molecular weight of about 1000 to about 4000, more preferably 1500 to 3500, and less than about 2 wt. % polar constituents. These lubricants modify the rheological properties of the compositions, thereby improving the processability in forming the elastomeric foamed article.

The ingredients incorporated into the compositions to be foamed of the present invention, in conjunction with the type of EPDM terpolymer, the degree of sulfonation, the metal counterion of the neutralized sulfonated EPDM terpolymer, and the polar plasticizer give materials processable by conventional fabricating equipment such as extruders and injection molding devices to form elastomeric foamed particles having unusual and desirable physical, chemical and rheological properties. A proper balance of oil, fillers and polar plasticizers is required to produce a foam having good cell structure and satisfactory density. For instance, too little polar plasticizer will result in a dense foam, while too much polar plasticizer will result in a foam having highly irregular cell structure. The unusual spectrum of physical and rheological characteristics of these foams was not previously obtainable in the aforementioned U.S. patents and applications previously incorporated herein by reference.

The foaming processes for sulfonated elastomers have the advantage of extreme rapidity while producing foam of excellent quality with a relatively uniform cell structure and small cell size. The extremely rapid foaming rates for sulfonated elastomers are possible because the material requires no precuring or postcuring treatments. By extrusion, shear rates of about 1,000 sec$^{-1}$ can be readily obtained for extruded foams. By compression molding, foaming times of less than two minutes can be achieved for half inch thick foam samples. These rates can be contrasted with the foaming rates for conventional cured elastomers. Cured EPDM's take from 20 minutes to many hours to be foamed and cured by compression molding; and around five minutes may be required for foaming and curing of extruded EPDMs. In addition, the long ovens required for the curing of extruded EPDM's are costly and space consuming.

It has been found that the most effective foaming processes for sulfonated elastomers involve putting the material under pressure, heating it, and then rapidly releasing the pressure and allowing the gases from the blowing agent to expand the material. For example, extrusion foaming and pressurized compression molding foaming have been found to be extremely effective in producing high quality foams of sulfonated EPDM. On the other hand, foaming by heating at atmospheric pressure was found to produce foams of poorer quality.

Foaming by compression molding typically involved the following procedures. The material to be foamed was compounded with the desired ingredients including the chemical foaming agent. This material was placed in a room temperature mold. The mold was placed in a hot press, and the press was partially closed. After softening had occurred, but before foaming, the press was closed completely under high pressure. After perhaps from 30 seconds to several minutes additional time, the press was rapidly opened and the material instantaneously foamed up. A rapid rate of opening of the press is important, since slow opening will hinder vertical rise of the foam and will tend to cause rupture of foam cells and escape of gas from the sides of the foaming material. No cooling is used before opening the press and foaming the material, because one of the objectives is to achieve a particularly rapid compression molding foaming process by taking advantage of the lack of need for postcuring treatment of the foam. Specific examples of foaming by compression molding are described later in this application. Foams produced by compression molding foaming have a number of important applications including foamed shoe soles and flexible insulation.

Foams of sulfonated EPDM containing a non-volatile polar plasticizer have been found to exhibit an unusual memory characteristic which has potential economic value. The memory characteristic works as follows: at a temperature above the usual use temperature, but well below the processing temperature, the foam is compressed and held in the compressed shape for a while—such as, for example, 10 min., or an hour, etc. An acceptable temperature might be between 60° and 130° C. The foam is then cooled to room temperature and released from compression. The released cooled foam does not return to its original shape, but it is found to retain an appreciably compressed shape. This compressed shape is found to substantially remain for periods of weeks or months. But, when the material is exposed again to roughly the intermediate temperature at which it was originally compressed, it is found to recover a substantial part of its original shape. An example of the utility of this behavior is for void filling, wherein compressed foam pieces are placed in the void and heated so that the foam completely and firmly fills the void. This procedure has use in both insulation and sound deadening applications. A specific use would be filling void spaces in the door of an automobile in which case the painting oven for the car would provide the needed heat.

Extrusion of sulfonated elastomer foams was found to be a particularly effective procedure for producing foams of small cell size, low density, and excellent appearance. In this procedure the material to be foamed is compounded with the desired ingredients. The foaming agent can be included in the formulation; or, in extruders properly instrumented it can be injected into the polymer in the extruder. The high pressures attainable in an extruder and the very rapid release in pressure of the material upon exiting the extruder are especially effective in producing excellent low density foams. Detailed examples of extrusion foaming of sulfonated EPDM foams are given later in this application. Extruded flexible foams can be used in a number of high volume applications including weatherstripping, and flexible insulation for piping.

The very rapid foaming rates possible with sulfonated EPDM as compared with conventional cured EPDM have been described earlier. There are also significant advantages of the foaming processes utilizing the non-volatile polar plasticizers of the present invention as compared to the foaming of sulfonated elastomers utilizing volatile polar plasticizers. When volatile polar plasticizers are utilized, they must be substantially volatilized and removed from the material as part of the foaming process since any remaining polar plasticizer will weaken the foamed material. However, if the volatile plasticizer is removed too early in the foaming process, the material will lack adequate rheology to produce high quality foams; this makes foaming processes utilizing volatile plasticizers quite difficult to control or to produce consistent results. An additional difficulty with volatile polar plasticizers is that some of the vapors of the plasticizer remaining in the cells of the material after foaming will condense, and this can result in partial collapse of the cell structure. Thus, the use of a volatile polar plasticizer imposes a number of restraints on the foaming process which are not present with the sulfonated elastomers of the present invention which utilize non-volatile polar plasticizers.

One of the unusual characteristics of the foamable compositions of this invention which contain non-volatile polar plasticizers in that the foaming process is relatively insensitive to temperature. By this it is meant, for example, that the extrusion foaming process as applied to these compositions can be effected at a melt temperature of from below 180° C. to about 230° C. with acceptable extruded foam materials. This is an unusual characteristic of this technology and it is believed to be a consequence of the strong ionic interactions, coupled with the plasticization process and the overall effect of temperature on these resultant interactions.

Foams made from sulfonated EPDM containing a non-volatile polar plasticizer can be reshaped by reheating of the material. However, with foams there is a danger that the cell structure will be damaged during reshaping processes. For example, when a thermoplastic foam is heated, fusion may take place in which parts of the foam material coalesce into bulk density material, or the cell structure may collapse under the forces of a shaping operation. With sulfonated EPDM foams, however, it has been observed that the cell structure can be maintained intact over reasonably long times, even at temperatures high enough for reshaping of the foam.

This desirable property of sulfonated EPDM foams containing a non-volatile plasticizer enables them to be rapidly and efficiently reshaped over a relatively broad temperature range without detrimental changes in the foam structure. This behavior allows objects made of sulfonated EPDM foams to be deeply embossed, or quickly stamped into desired configurations. Some detailed examples of the rapid reshaping of sulfonated EPDM foams are given later in this application. This characteristic of thermal reforming enables a novel and economically attractive procedure for fabricating shaped objects from flexible foam. Conventionally, shaped elastomeric foams are foamed directly into the desired form. This requires that the fabricator undertake the complex and expensive job of foaming simultaneously with production of the final foamed object. With these sulfonated EPDM foams, however, a less demanding procedure is possible. Sheet foam could be produced by a high volume foam sheet goods manufacturer, and this material would be transported to the fabricator. The fabricator would reheat the foam sheet, and then rapidly stamp it into the desired shape by such techniques as compression molding, vacuum forming, and so forth. In this way, such objects as foamed shaped shoe soles, shaped foam inner liners for clothing and shoes, and foam rubber toys could readily be made.

Reprocessability of a foam material can have considerable economic value because many foaming operations generate an appreciable amount of scrap foam. For example, it is not uncommon for 25% of a foaming operation to be scrap. Conventional cured rubber foams cannot be reprocessed without expensive chemical regeneration procedures. Foams of sulfonated EPDM which are made with a volatile plasticizer lose most of the plasticizer in the foaming operation so they become relatively intractable, and their reprocessing requires re-incorporation of the volatile plasticizer into the sulfonated polymer such as by dissolving the polymer and adding the volatile plasticizer in solution. The sulfonated elastomers of the present invention utilize a non-volatile polar plasticizer which remains in the foam after the foaming operation. Because of the continued presence of the non-volatile polar plasticizer, at elevated temperature the polar plasticizer weakens the physical crosslinks of this ionomer and the foam is readily melt reprocessable. To reprocess scrap or waste foam of this material it is only necessary to add additional foaming agent into the polymer, such as in an intensive mixer or on a 2 roll mill, and then refoam the material. Alternately, it may be possible to simply crumb the foam and dry blend a chemical foaming agent with it. The presence of the non-volatile polar plasticizer insures continued excellent melt reprocessability, so this dry blend can be utilized directly as the feed for an extrusion foaming operation or similar procedure. This simple reprocessing procedure for sulfonated elastomer foams has obvious economic value in the reuse of scrap foam and in addition, has environmental advantages in enabling easy recycling of obsolete foamed items. A detailed example of the reprocessing of a sulfonated EPDM foam containing a non-volatile polar plasticizer is given later in this application.

The flexible foams prepared in this invention can possess densities which vary widely according to the conditions under which they are prepared. Foam densities below 2 lb. per cubic foot or lower are feasible, and densities as high as 50 lbs. per cubic foot can also be achieved; preferably foam densities of 5.0 lbs./cubic foot to 40 lbs./cubic foot are achieved. In general, to prepare low density foams, higher foaming temperatures, increased concentration of foaming agents, and higher pressures and faster pressure changes upon foaming are used.

DETAILED DESCRIPTION OF PREFERRED EMBODIMENTS

EXAMPLE 1

PREPARATION OF A LIGHTLY SULFONATED EPDM GUM MATERIAL

The EPDM elastomeric polymer used as the backbone polymer for making the sulfonated product had a composition of about 52 wt. % ethylene, 43 wt. % propylene and 5 wt. % of 5-ethylidene-2-norbornene, and it had a Mooney viscosity ML @ 100° C. (1+8 min) of about 40. This base polymer was lightly sulfonated using acetyl sulfate in accordance with the method disclosed in U.S. Pat. No. 3,836,511 to a sulfonate level of about 28 meq. of sulfonic acid groups attached to the EPDM polymer per 100 g of polymer. This free acid form of the sulfonated polymer was neutralized with twice the equivalence of magnesium stearate. The excess mangesium stearate and the stearic acid resulting from the neutralization reaction remained in the polymer to provide plasticization and weakening of the ionic bonds in the polymer at elevated temperatures so that the polymer could be processed. The magnesium stearate and stearic acid thus functioned as non-volatile polar plasticizers; in the absence of a polar plasticizer this sulfonated polymer cannot be satisfactorily foamed.

EXAMPLE 2

FOAMING OF LIGHTLY SULFONATED EPDM BY EXTRUSION

The lightly sulfonated EPDM material prepared in Example 1, was mixed on a two-roll mill with 30 phr of a processing oil (Flexon 845) and with 4 wt. % (based on polymer plus oil) of the nitrogen releasing chemical blowing agent Kempore 200 (whose active ingredient is azodicarbonamide). The temperature of milling was well below the decomposition temperature of the chemical foaming agent, to avoid loss of foaming effectiveness. The material was then placed in a capillary rheometer (Instron Model No. A70) at 100° C., and then the temperature of the rheometer was steadily increased. The material was extruded at various shear rates over a range of increasing temperatures. Excellent foams were obtained at temperatures between about 180° C. and 230° C. at high shear rates. For example, a sample which was extruded at a shear rate of about 3000 sec$^{-1}$ at a temperature of about 210° C. was found to have a fine and relatively uniform cell structure and a density of about 6.3 pcf.

This example illustrates that excellent quality foams of lightly sulfonated elastomers can be produced by extrusion techniques. Also, this example shows that extremely high extrusion rates—up to 3000 sec$^{-1}$ can be utilized. This is in contrast to the slow extrusion rates and extensive curing ovens required for conventional cured EPDM. This example also illustrates the very broad temperature range of about 50° C. over which this material can be foamed. This insensitivity to foaming temperature is an unusual characteristic of these sulfonated elastomers and it has advantages in allowing relatively wide variances in processing temperatures while still producing satisfactory foams.

EXAMPLE 3

FOAMING OF LIGHTLY SULFONATED EPDM BY COMPRESSION MOLDING FOAMING

The material prepared in Example 1 was combined with 2 wt. % of Kempore 200 chemical blowing agent on a two-roll mill. The material was put in a two-plate mold and placed in a press at 450° F. After 40 seconds the press was opened; the material instantly foamed up. The foam was removed from the mold and examined. It was seen to have a fine closed cell structure and its density was measured to be 24.8 pcf. Closed cell foams are desirable where a vapor barrier is needed, where the extra support of the trapped air is required, or for insulation applications.

This example illustrates that compression molding foaming of lightly sulfonated EPDM can be satisfactorily accomplished and that excellent foams can be produced. This example also shows how rapidly the foaming operation can be accomplished, with well under a minute in the press and with no postcuring required for this material. This is in contrast to the foaming of conventional EPDM which requires both a partial precure prior to foaming and a postcure after foaming, so that the foaming process for conventional EPDM may take 20 minutes or more.

EXAMPLE 4

FOAMING OF OIL AND FILLER EXTENDED SULFONATED EPDM

The material prepared in Example 1 was combined with 65 phr of processing oil—Flexon 845. To this material were added 25 wt. % of whiting (Allied, ground calcium carbonate) and 5 wt. % of Opex 93 blowing agent (active ingredient: dinitrosopentamethylenetetramine). All of the mixing was done on a two-roll mill. This sample was placed in a two-plate mold, and the mold was placed in a press at 450° F. for about 15 seconds. Then the press was opened and the sample was left in the hot opened press for 30 seconds more before removing it. The foam was found to have an excellent fine cell structure, and a density of about 39 pcf.

This example illustrates the satisfactory foaming of a lightly sulfonated EPDM material which has been extended with oil and a mineral filler. The foaming was very rapid—less than one minute. This example also shows the use of a different nitrogen releasing blowing agent, Opex 93.

EXAMPLE 5

FORMATION OF AN OPEN CELLED FOAM OF LIGHTLY SULFONATED EPDM USING A CARBON DIOXIDE RELEASING BLOWING AGENT

The material prepared in Example 1 was combined with 10 wt. % of Unicel S, which is a carbon dioxide releasing chemical blowing agent, on a two-roll mill. This material was placed in a two-plate mold in a press at 360° F. for about five minutes. The press was opened and the material immediately foamed up. The foam was seen to have an open celled structure which was relatively uniform. The density was measured to be about 19 pcf.

This example shows that open-celled foams of lightly sulfonated EPDM can be produced by using a carbon dioxide releasing chemical blowing agent. Open-celled foams are needed where softness is desired or in applications where the foam is highly compressed part of the time and needs to re-expand to its uncompressed form rapidly.

EXAMPLE 6

FOAMING OF AND REPROCESSING (REFOAMING) OF A LIGHTLY SULFONATED ELASTOMER

The material prepared in Example 1 was combined with 65 phr of a processing oil—Flexon 845, on a two-roll mill. To this material was added one wt. % of Kempore 200 chemical blowing agent which was milled in at a temperature well below the decomposition temperature of the blowing agent. The sample was extruded in an Instron Capillary Rheometer at a shear rate of about 3000 sec$^{-1}$ and at a temperature of 210° C. The resulting foam had a fine cell structure and a density of about 17 pcf.

To demonstrate that scrap foam or discarded foams of lightly sulfonated EPDM which contain non-volatile polar plasticizers can be melt reprocessed and reused, the following procedure was followed. First, this sample was milled on a two-roll rubber mill at elevated temperature in order to compact it; and then at reduced temperature one wt. % of Kempore 200 was milled into it. It was then molded into small pads and was placed in a make-shift capillary rheometer which had been made by drilling a hole in the wall of a Carver test cylinder. The test cylinder was placed in a heated press and the sample was extruded at a temperature of roughly 220° C. by applying pressure to the test cylinder. Although the structure of this foam was not as regular as the original extruded foam, the cell structure was still fine and of good quality and the density was about 24 pcf.

This example shows that foams of lightly sulfonated EPDM containing a non-volatile plasticizer can be reprocessed in melt form. The reprocessing consists of simply compacting the foam and adding additional blowing agent to it in an intensive mixer. The material can then either be foamed again directly or it can be combined with virgin material prior to foaming. This simple procedure of melt reprocessing is not possible with the conventional chemically cured EPDM since after crosslinking it is no longer melt processable. The melt reprocessing is also not possible with lightly sulfonated EPDM which utilizes a volatile polar plasticizer, since substantial amounts of the volatile plasticizer are lost in the foaming process and the material no longer has satisfactory melt rheology. This shows the advantage of the foams of lightly sulfonated EPDM containing a non-volatile polar plasticizer for reprocessing of the foam. The reprocessability is of significant environmental value since it allows for recycling of foamed materials no longer in use. Even more important economically are the savings from melt reprocessing of scrap foam—in some operations as much as 25% of the foam produced is scrap.

EXAMPLE 7

THERMAL REFORMABILITY OF LIGHTLY SULFONATED EPDM FOAMS CONTAINING A NONVOLATILE POLAR PLASTICIZER

In this example, we illustrate the reshaping of a sulfonated EPDM foam at elevated temperature from its original form (in this case a flat sheet of foam) to a different shape (in this case a strip of foam containing both a 49° angle and an 89° angle). In order to accomplish this reshaping and have it remain permanently, the foam must exhibit substantial melt flow at the temperature of reshaping. Such reshaping is not feasible with conventional cured EPDM. With the lightly sulfonated EPDM the unplasticized gum is too intractable to be satisfactorily reshaped, so the use of a volatile plasticizer for foaming would also not be satisfactory since much of the volatile material is removed from the material during the foaming process. For these reasons, the use of a non-volatile polar plasticizer which remains in the material after foaming is crucial to rapid and satisfactory reshaping of the foam. In the reshaping of the foamed material containing the non-volatile polar plasticizer, there is a danger that the delicate cell structure will be damaged—such as by fusion and coalescence of the cells into high density regions, or collapse of the cell structure under the forces of the shaping operation. However, we have found that with lightly sulfonated EPDM foams containing a non-volatile polar plasticizer, the reforming can be accomplished readily at high temperatures while maintaining an excellent cell structure intact. In fact, it has been found that foams of lightly sulfonated EPDM can be readily and efficiently reshaped over a relatively broad temperature range without detrimental changes in the foam structure. Apparently the broad temperature range for reshaping is a result of the unusually small dependence of viscosity on temperature in this range for the sulfonated material. Among items which have been successfully reformed in this manner are foamed cups which were thermally reshaped from a flat foam sheet, and shaped shoe soles with an instep profile which were also thermally reformed from a flat foam sheet. To illustrate the rapidity and accuracy with which samples of lightly sulfonated EPDM containing a non-volatile plasticizer can be reformed, data is given in Table III. The neutralized lightly sulfonated EPDM gum used in these examples was similar to that described in Example 1, except that it contained a higher level of sulfonation—about 40 meq. per 100 g of gum. It was neutralized with twice the equivalence of magnesium stearate to produce stearic acid and excess magnesium stearate which function as non-volatile polar plasticizers. To 100 parts of this plasticized gum were added 61 parts of Flexon 845 processing oil, 41 parts of Allied whiting, and 1.5 parts of Opex 93 blowing agents on a two-roll rubber mill at a temperature well below the decomposition temperature of the blowing agent. This material was foamed by the compression molding foaming procedure to obtain a flat sheet of excellent uniform cell structure with a density of about 16 pcf, and with a height of about one-half inch. Pieces were cut from this flat sheet of foam for thermal reforming under different conditions. The mold for reshaping the flat sheet of foam consisted of bottom and top sheets of metal which were mated and which contained two bends—one of 49° and one of 89°. The procedure was to preheat the flat foam sheet outside of the mold, and then to hold it in the shaped mold for the designated amount of time. Table III shows that only 30 seconds in the mold is adequate for accurately reshaping this material. When cooled to ambient temperatures these reformed foams retained their new shapes and were also seen to have retained an excellent foamed cell structure. Also, even when subjected to the elevated temperature of 70° C. for 15 minutes, the foam retains its shape fairly well.

This characteristic of thermal reforming may enable a novel and economically attractive procedure for fabricating shaped objects from flexible foam. Conventionally, shaped elastomeric foams are foamed directly into the desired form. This requires that the fabricator undertake the complex and expensive job of foaming the material simultaneously with shaping of the final foamed object. With lightly sulfonated EPDM foams, however, a less demanding procedure is possible. Sheet foam could be produced by a high volume foam sheet goods manufacturer, and this material would be transported to the fabricator. The fabricator would reheat the foam sheet, and then rapidly stamp it into the desired shape by such techniques as compression molding, vacuum forming, and so forth. In this way, such objects as shaped shoe soles, shaped foam inner liners for clothing and shoes, and rubber toys could readily be made from flat sheets of foam.

TABLE III

THERMAL RESHAPING OF A FLAT SHEET FOAM OF SULFONATED EPDM

Shape of mold:
First angle = 89°
Second angle = 49°

| Shaping Conditions In Mold[1] | Angles On Cooled Reshaped Foam | | Angles on Reshaped Foam After Thermal Treatment of 70° C. For 15 Minutes | |
|---|---|---|---|---|
| 190° C. 30 seconds | 89 | 49 | 75 | 37 |
| 190° C. 10 seconds | 75 | 39 | 72 | 39 |

[1]Foam sheets were preheated outside of the mold for 10 minutes at designated temperature prior to reshaping operation in the mold.

EXAMPLE 8

PREPARATION OF A ZINC NEUTRALIZED LIGHTLY SULFONATED EPDM FROM A LOW MOONEY EPDM

A lightly sulfonated elastomer was prepared from an ethylene-propylene ethylidene norbornene terpolymer (EPDM) containing about 52 wt. % ethylene, 43 wt. % propylene and 5 wt. % of the termonomer, and having a Mooney viscosity ML @ 100° C. (1+8 min) of about 20. This base polymer was lightly sulfonated to a level of about 32 meq. per 100 g of material using acetyl sulfate in accordance with the method disclosed in U.S. Pat. No. 3,836,511. This free acid form of the sulfonated polymer was neutralized in solution with 3 equivalents of zinc acetate, per equivalent of sulfonation, and then 3 equivalents of stearic acid was dissolved in the polymer solution. The material was isolated by steam stripping of the solvent. The stearic acid which was added to the material functions as a non-volatile polar plasticizer.

EXAMPLE 9

PHYSICAL PROPERTIES OF SOME LIGHTLY SULFONATED EPDM FOAMS CONTAINING A NON-VOLATILE PREFERENTIAL PLASTICIZER

In this example, tensile and compression set measurements were made on four foamed samples covering a range of densities from 7 to 28 pcf. The samples include both oil and filler formulations and plastic blend formulations. Each type of formulation was foamed by both extrusion and by compression molding foaming. The preparation of the gum utilized in these formulations is described in Example 8.

The formulations for the materials which were foamed are given in Table IV. The processing times for making these foams were quite short. The compression molded samples took from about 1½ to 4 minutes for the foaming (heating) process. The extruded foams made in an Instron Capillary Rheometer were extruded at rapid shear rates of between 1500 sec$^{-1}$ and 3000 sec$^{-1}$. In all of these samples the cell structures were fine and relatively uniform.

Tensile strength is less important in foams than in bulk materials because foams are generally used in the compressive mode. However, tensile strengths are listed in Table V. The tensile strengths for the oil and mineral filled systems are roughly in the range of cured EPDM foam systems with comparable density and loadings of oil and mineral filler. Foams made from plastic blend lightly sulfonated EPDM tend to have higher tensile strengths than oil and mineral extended foams at a given density.

Compression set values are given in Table V at both room temperature and at 70° C. In addition, the recovery values are indicated at various recovery times of from 30 minutes up to 5 days. The compression set values of all of these lightly sulfonated EPDM foam compositions are relatively good at long recovery times when set is measured at room temperature. This observation is relevant because in many foam applications, unlike bulk rubber requirements, compression set values after 24 hours recovery are employed. Thus, for many applications it would appear that the formulations of Table V would be suitable from the standpoint of compression set requirements. Compression set values at elevated temperatures are considerably poorer than at room temperature, so the foams of this example could not be used in applications which require good compression set at elevated temperatures. However, there appear to be a number of high volume foam applications for which low values of compression set are not required; for example, selected gasket applications, shoe soles, backing for floor coverings, etc.

TABLE IV

SOME FORMULATIONS OF SULFONATED EPDM USED FOR FOAMING STUDIES

| A. An Oil and Filler Formulation | |
|---|---|
| Ingredient | Weight (per 100 parts of gum [phr]) |
| Gum[1] | 100 |
| Oil[2] | 30 |
| Whiting[3] | 30 |
| Opex 93[4] | 2 |
| Magnesium Hydroxide | 3.1 |

| B. A Plastic Blend Formulation | |
|---|---|
| Ingredient | phr |
| Gum[1] | 100 |
| Low Density Polyethylene[5] | 42.9 |
| Opex 93[4] | 2 |
| Magnesium Hydroxide | 2.5 |

[1]The gum is described in Example B.
[2]Flexon 845 processing oil, Exxon Chemical Co.
[3]Allied Whiting (ground calcium carbonate).
[4]Chemical foaming agent; active ingredient is dinitrosopentamethylenetetramine.
[5]Enjay LD 605 (M.I. is 7.5., sp. gr. is 0.92).

TABLE V

| Formulation | Foaming Method | Foam Type | Density (pcf) | Cell Structure | Compression Set 23° C. Recovery Time | | | Compression Set 70° C. Recovery Time | | | Tensiles (23° C.) Tensile Strength (psi) | Elong. | 100% Modulus (psi) |
|---|---|---|---|---|---|---|---|---|---|---|---|---|---|
| | | | | | 30 min | 5 hr | 3 day | 30 min | 5 hr | 3 day | | | |
| A | Extruded | Oil and Mineral filler | 17 | 20 mil avg. cell dia., uniform structure | 45% | 25% | 7% | 75% | 65% | 45% | 145 | 250% | 90 |
| A | Compression molded | Oil and MIneral Filler | 10 | Fine and uniform | 60% | — | ~10% | 80% | 50% | 30% | 60 | 240% | 35 |
| B | Extruded | Plastic blend | 28 | 4 mil avg. cell dia., uniform structure | 20% | 10% | 5% | 80% | 75% | 70% | 400 | 300% | 260 |
| B | Compression molded | Plastic blend | 7 | Fine and uniform | 35% | — | 5% | 55% | 45% | 35% | 95 | 320% | 55 |

EXAMPLE 10
HIGH PRESSURE COMPRESSION MOLDING FOAMING OF AN OIL AND WHITING FORMULATION

The formulation was as follows:

| | |
|---|---|
| Sulfonated EPDM Gum | 150g |
| Flexon 845 Oil | 45g |
| Allied Whiting | 45g |
| Mg(OH)$_2$ | 4.58g |
| Opex 93 | 3.0g |

The preparation of the gum was described in Example 8. The gum was banded on a two-roll mill at 250° F. Then the premixed oil and whiting were added on the hot mill and dispersed well. Next, the Mg(OH)$_2$ was added on the hot (250° F.) mill and mixed in. The material was removed from the mill and the mill was cooled to room temperature. The Opex 93 chemical foaming agent was then added to the material on the cool mill. The final mix appeared to be excellent having good dispersion of the ingredients and banded nicely on both the hot and cold mill.

This material was compression molding foamed on a heated press in a three inch square aluminum "frame mold". This mold consisted of one-half inch thick by nine inch square aluminum plates on either side of the one-eighth inch thick frame. The lower mold plate was placed on a thin flat mold carrier plate as is usual, and the frame was placed on top of the lower plate. The mold cavity was then filled with the compound at room temperature. Next a second mold carrier plate was placed on top of the mold frame and the top plate of the mold was placed on top of this mold carrier plate. This combination was placed between the platens of a Walbash Model 12-10-2T hydraulic press. The press temperature was 430° F. as measured by thermometers inserted into deep holes in the platens. Eight tons pressure was applied to the mold. After 60 seconds, the cool mold plates had caused the temperature of the platens to decrease to 375° F. After 150 seconds the temperature had increased to 400° F. and the press was rapidly opened while holding the upper mold plate firmly against the upper platen with the mold carrier; this procedure removed the weight of the upper plate from the foam while opening the press. As the low platen dropped, the material instantaneously foamed. The relatively rapid rate of opening of this press was important for the achievement of low densities and minimizing cell rupture in the foam.

The foam prepared in this manner had a density of 9.1 pcf, and a fine and relatively uniform cell structure. The Shore 00 hardness was 30.

This example illustrates the compression molding foaming of a metal neutralized gum in an oil and filler formulation, and shows that low density foams of excellent quality can be obtained.

EXAMPLE 11
EXTRUSION FOAMING OF AN OIL AND WHITING FORMULATION IN AN INSTRON CAPILLARY RHEOMETER

The same formulation used in Example 8 was employed in this example. About 12 g of the material was cut up and loaded into the rheometer at about 50° C. The material was then extrusion-foamed at various shear rates and temperatures. A sample of foam which was prepared in this manner by extruding at a shear rate of 3000 sec$^{-1}$ at 197° C. had a density of 16.6 pcf and a fine, relatively uniform cell structure. The Shore 00 hardness was 43.

This example illustrates the very rapid extrusion rate for foaming a metal neutralized sulfonated EPDM gum containing oil and filler. Note that no postcure is needed so the total processing time is extremely short.

EXAMPLE 12
HIGH PRESSURE COMPRESSION MOLDING FOAMING OF A PLASTIC BLEND FORMULATION

The formulation was as follows:

| | |
|---|---|
| Sulfonated EPDM gum | 35g |
| Low density polyethylene (Enjay LD 605, MFR 7.5) | 15g |
| Mg(OH)$_2$ | 1.42g |
| Kempore 200 | 1g |

The preparation of the gum was described in Example 8. All of the ingredients except for the Kempore 200 chemical foaming agent were mixed in a 50 cc Brabender mixing head having Banbury type blades. The temperature was 135° C. and the mixing speed was 50 RPM. The gum was first mixed by itself for one minute, next the plastic was added and mixed in for one and a half minutes. Then the magnesium hydroxide was added and the mix was continued for an additional two and a half minutes for a total mix time of five minutes. When the blend was removed from the mixing head it was seen to have a slightly foamed structure—probably due to the presence of some water in the mix. The mix was immediately transferred to a three inch electrically heated 2 roll mill set at 105° C. and banded. The temperature of the material (measured with a thermocouple inserted into the polymer material itself) was 102° C. The Kempore 200 was then added to the polymer and milled in over four and a half minutes. The final temperature of the material just before removing it from the mill was 98° C. The mix appeared to have excellent dispersion of the ingredients and it banded nicely on the two-roll mill.

This material was compression molding foamed in the same manner as in Example 10. The initial temperature of the press was 435° F. and 60 seconds after the cool mold was put in, the temperature had dropped to 395° F. When the press was opened after 180 seconds, the temperature was back up to 435° F. The material foamed up nicely as the bottom platen dropped.

The foam prepared in this manner had a density of 6.8 pcf, and it had a fine and very uniform cell structure. The Shore 00 hardness was 45.

This example shows that good quality foams of sulfonated EPDM can be made from plastic blends. One of the advantages of plastic blends is greater stiffness.

EXAMPLE 13

EXTRUSION FOAMING OF A PLASTIC BLEND FORMULATION IN AN INSTRON CAPILLARY RHEOMETER

The formulation was as follows:

| | |
|---|---|
| Sulfonated EPDM gum (including 3 equivalents of stearic acid added per equivalent of sulfonate groups) | 35g |
| Low density polyethylene (Enjay LD 605, MFR 7.5) | 15g |
| Mg(OH)$_2$ | 0.89g |
| Opex 93 | 0.7g |

In a manner similar to that described in Example 12, the ingredients except for the Opex 93 were blended in a 50 cc Brabender mixing head and then the Opex 93 was added on a heated three inch two-roll mill. The material was then extruded in an Instron Capillary Rheometer as described in Example 11. A sample of plastic blend foam which was prepared in this way by extruding at a shear rate of 1500 sec$^{-1}$ at 240° C. had a density of 10.8 pcf and a fine, relatively uniform cell structure. The Shore 00 hardness was 52.

This example illustrates that plastic blends of sulfonated EPDM can be rapidly extruded to produce good quality foams of low density.

Since many modifications and variations of this invention may be made without departing from the spirit or scope of this invention thereof, it is not intended to limit the spirit or scope thereof to the specific examples thereof.

What is claimed is:

1. An injection or compression moldable or extrudable elastomeric composition which consists essentially of:
   (a) a neutralized sulfonated EPDM terpolymers, said sulfonated EPDM terpolymer having about 10 to about 1000 meq. of neutralized sulfonate groups per 100 grams of said sulfonated EPDM terpolymer, said neutralized sulfonate groups containing metallic cations;
   (b) less than about 100 parts by weight of a non polar process oil per 100 parts by weight of said neutralized sulfonated EPDM terpolymer, said oil having less than 2 wt. % polar type compounds:
   (c) less than about 200 parts by weight of an inorganic filler per 100 parts by weight of said neutralized sulfonated EPDM terpolymer, said filler being selected from the group consisting of carbon black, silicates, talcs, clays and calcium carbonates and mixtures thereof;
   (d) a solid non-volatile preferential ionic plasticizer at about at least 8 parts by weight per 100 parts by weight of said neutralized sulfonated EPDM terpolymer, said preferential plasticizer plasticizing said sulfonate groups, said preferential plasticizer being selected from the group consisting of ureas,, thioureas, fatty acids having about 12 to about 40 carbon atoms and metal salts of said fatty acids thereof; and
   (e) a chemical foaming agent at a concentration level of about 0.25 to about 5 parts by weight per 100 parts by weight of said neutralized sulfonated EPDM terpolymer.

2. A composition according to claim 1, wherein said foaming agent is selected from the group consisting of bicarbonates, citric acid, amides, hydrazides, or diazo compounds.

3. A composition according to claim 1, wherein said preferential plasticizer is zinc stearate.

* * * * *